United States Patent [19]

Keenan et al.

[11] 3,767,304
[45] Oct. 23, 1973

[54] APPARATUS AND METHOD FOR DETECTION OF INTERNAL SEMICONDUCTOR INCLUSIONS

[75] Inventors: William A. Keenan, Poughkeepsie; Michael R. Poponiak, Newburgh; Tsu-Hsing Yeh, Poughkeepsie, all of N.Y.

[73] Assignee: International Business Machines Corporation, Armonk, N.Y.

[22] Filed: July 3, 1972

[21] Appl. No.: 268,355

[52] U.S. Cl. .................. 356/51, 356/201, 250/358, 250/336, 256/338, 356/237, 356/239
[51] Int. Cl. ....................... G01n 21/16, G01n 21/32
[58] Field of Search ....................... 250/338–341, 250/358–360, 336; 356/201, 51, 237, 239

[56] References Cited
UNITED STATES PATENTS

| | | | |
|---|---|---|---|
| 3,405,270 | 10/1968 | Briggs | 356/51 X |
| 3,465,150 | 9/1969 | Hugle | 356/51 X |
| 3,297,873 | 1/1967 | Hounanian et al. | 307/228 |
| 3,322,955 | 5/1967 | Desuignes | 417/246 |

OTHER PUBLICATIONS

Holejko, Elektronika, Vol. 4, No. XI, pp. 164–166, 1970,

Simpson et al., Materials Evaluation, 28, (9), Sept. 1970, pp. 205–211

*Primary Examiner*—David Schonberg
*Assistant Examiner*—R. J. Webster
*Attorney*—Wolmar J. Stoffel et al.

[57] ABSTRACT

An apparatus for detecting the presence of inclusions in semiconductor material having a polychromatic light source, a support for a semiconductor body, a light sensing means positioned to operate on light transmitted through the body from the light source, the sensing means including a substrate of the same type of semiconductor materials as the material of the semiconductor body, and having at least a PN junction in the substrate with means to backbias the junction, a means to indicate the relative amounts of light transmitted through the semiconductor body that is sensed by the sensing means.

A method for detecting internal inclusion in a semiconductor body by directing through the body a beam of polychromatic light, sensing the light energy transmitted to the body with a light sensing element of the same type semiconductor material as the body being investigated.

8 Claims, 4 Drawing Figures

United States Patent [19]
Keenan et al.
[11] 3,767,304
[45] Oct. 23, 1973
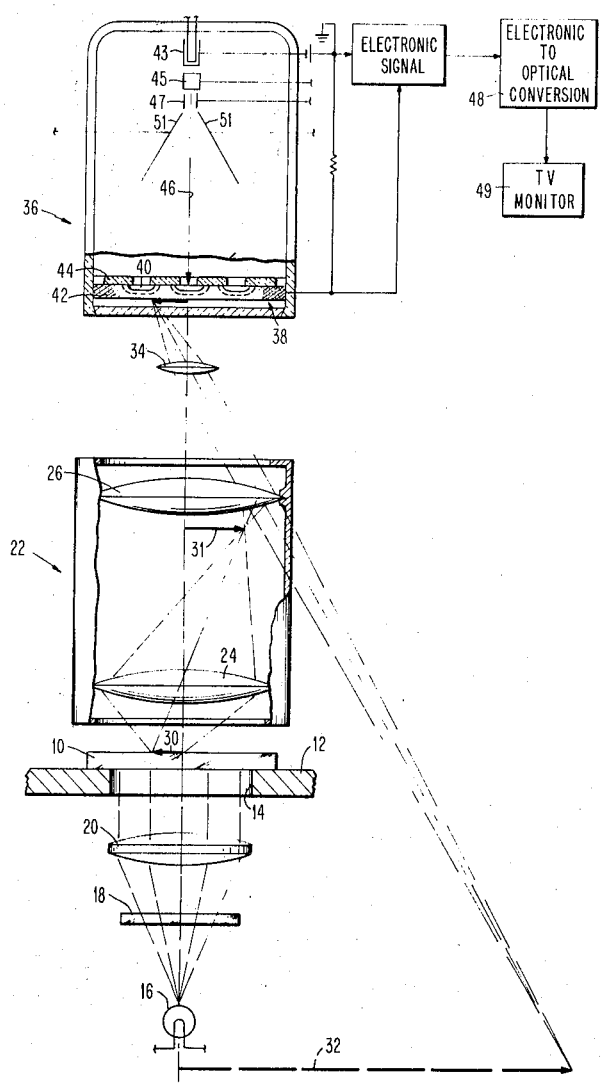

APPARATUS AND METHOD FOR DETECTION OF INTERNAL SEMICONDUCTOR INCLUSIONS

BACKGROUND OF THE INVENTION

1. Field of the Invention

This invention relates to method and apparatus for investigating and analyzing the structure of a semiconductor body, more particularly for determining the location and nature of inclusions in semiconductor devices.

2. Description of the Prior Art

Semiconductor technology is becoming increasingly more sophisticated. Semiconductor devices, especially integrated circuit devices, are becoming increasingly smaller and more complex, necessitating greater precision in fabrication techniques and processes. The miniaturization and also the demand for greater individual device performance, especially higher switching speeds, have created the need for greater precision and increased control in semiconductor manufacturing processes. In order to exercise greater control over manufacturing processes, it is imperative that the resultant produce be analyzed with a high degree of precision. For example, in manufacturing semiconductor devices, masks and resists are used for forming diffusion windows in an organic layer that is impervious to the dopant being diffused. A small pin-hole in the mask, or a speck of dust in the resist may result in a small hole in the masking inorganic layer that is not desired. During the subsequent impurity diffusion step, an additional impurity region is formed through this opening. Depending on where the region occurred, the device could be rendered defective. In order to detect and determine the location of such defects by prior art techniques, the insulation was stripped from the device and the surface stained. Such a procedure was time-consuming and tedious and destructive, since the utility of the semiconductor body is essentially destroyed by the stripping and staining operations.

In the manufacturing of devices, frequently electrical shorts occur between the conductive metallurgy stripes. Such shorts are difficult to observe optically because of the high percent reflectance of the metal contact pattern. Further, in the forming of a metallurgy system by anodic oxidation of an aluminum layer in selected regions, as disclosed in commonly assigned patent application Ser. No. 239,082, shorts can occur when the anodization is not carried on long enough to completely anodize the aluminum between adjacent strips. Since the metal is covered by an overlying layer of aluminum oxide, this condition cannot be conveniently and reliably observed visually.

In aligning masks over a semiconductor having diffused regions, it is important to be able to clearly distinguish the location of the diffused regions. The regions are difficult to observe visually.

This invention facilitates the detection and/or visual observation of various semiconductor defects such as spurious diffusions caused by defective masks or resist layers, metal shorts between stripes, either covered or uncovered, and the like.

SUMMARY OF THE INVENTION

An object of this invention is to provide a new method for inspecting semiconductor elements.

Another object of this invention is to provide a new apparatus for inspecting semiconductor elements.

Yet another object of this invention is to provide a new method for detecting the presence of inclusions in a semiconductor body, particularly semiconductor impurities.

Another object of this invention is to provide a new apparatus for visually detecting inclusions in a semiconductor body, determining the location and extent of diffused regions, PN junctions, etc.

In accordance with the aforementioned objects, the invention is based upon the concept that when directing a beam of polychromatic light through a semiconductor body, the body acts as a filter allowing transmission of only light energy less than the band-gap energy of the semiconductor material under investigation. When the light energy transmitted through the semiconductor is sensed by a semiconductor light sensor formed of the same type semiconductor material as the body under investigation, the resolution is greatly improved. As will be explained in more detail later, a semiconductor light sensing element responds significantly only to light energy equal to and greater than the band-gap energy of the semiconductor of the sensing element. The end result is a system response over a very narrow light energy wavelength resulting in improved resolution of foreign materials in or on the semiconductor body.

BRIEF DESCRIPTION OF THE DRAWINGS

The foregoing and other objects, features and advantages of the invention will be apparent from the following more particular description of the invention. In the Drawings

DESCRIPTION OF THE PREFERRED EMBODIMENTS

Figure 1:
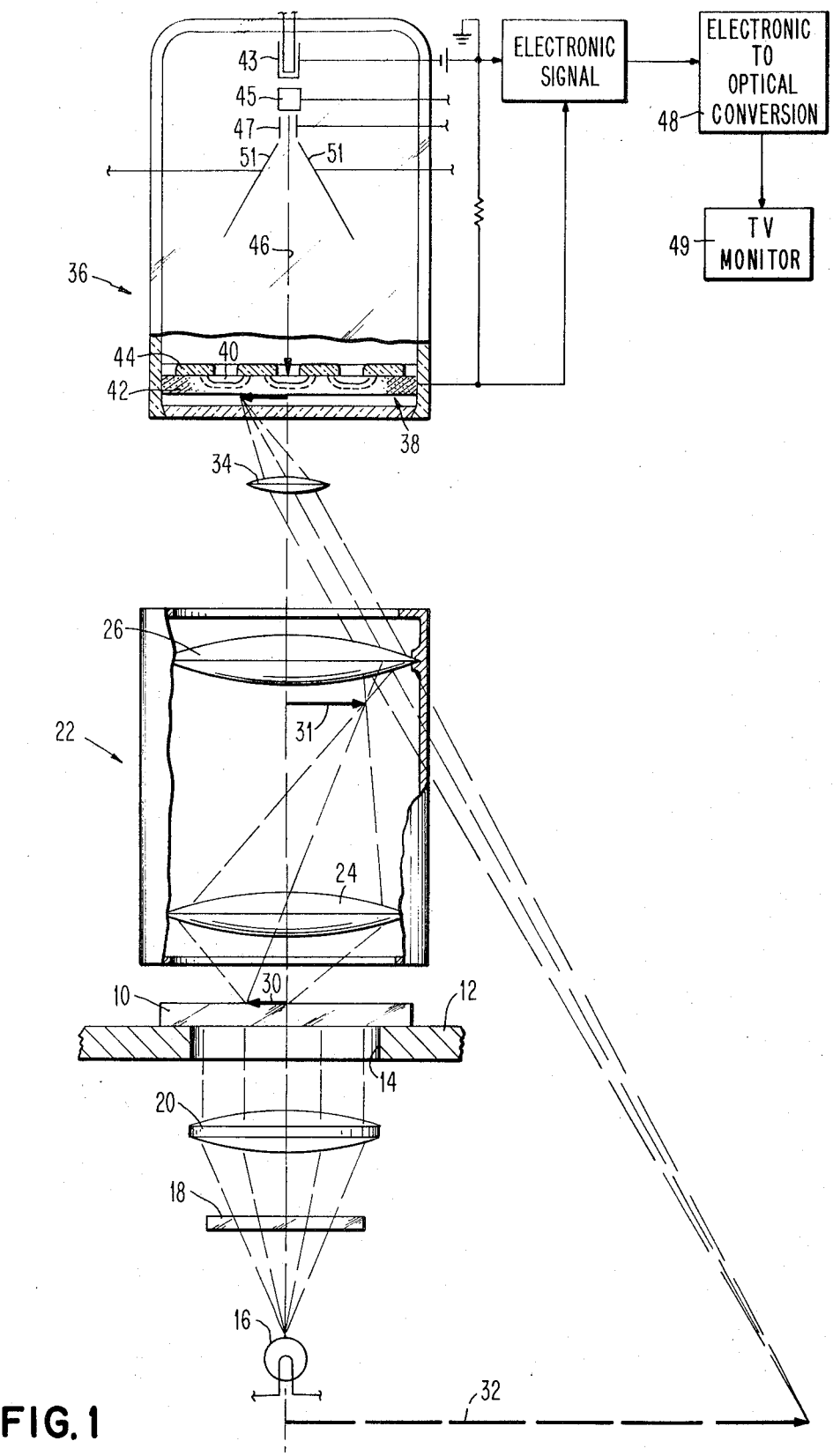
FIG. 1 is a schematic diagram illustraing the elements and the arrangement thereof of a preferred specific embodiment of the apparatus of the invention.

Referring now to FIG. 1, there is depicted schematically a preferred specific embodiment of the apparatus of the invention. The sample or specimen 10 is a semiconductor body which, in practice, may be a semiconductor wafer with regions of opposite conductivity therein formed by diffusion or ion implantation. Body 10 typically is silicon, germanium, gallium arsenide, or other semiconductor material. Semiconductor body 10 is supported on a stage 12, having an aperture 14 on the bottom side thereof which allows light energy from light source 16 to pass through the body 10. The light source 16 can be any suitable type light source, preferably one which produces polychromatic light. Typically, source 16 is a standard microscope light having a tungsten filament. The light source must have a spectrum with at least the energy slightly less than the band-gap energy of the semiconductor material of body 10. A filter 18 may be provided to reduce the intensity of the light from source 16 in order to avoid overloading the detector. The lens 20 is preferably provided tofocus the light from sensor 16 evenly over the surface of semiconductor body 10 and arrange the light rays into a generally parallel relationship.

Since the details to be observed in the semiconductor body 10 are normally very small, some means is usually necessary to enlarge the image. Microscope 22 serves this function. The microscope 22 is conventional, having an objectiv lens 24, and an ocular or eyepiece lens 26. The object, depicted by arrow 30, is located just outside the focal point of objective lens 24. Lens 24 forms a real magnified image 31 which becomes the object for eye-piece lens 26. The eypiece lens 26, functioning as a magnifier, forms a large virtual image 32 which becomes the object image for the detector lens. The microscope 22 itself does not constitute part of the invention and is disclosed and described in more detail in "Fundamentals of Optics", Jenkins and White, by McGraw-Hill, 1957. A detecto lens 34 serves to fucus the image 32 of eyepiece 26 on the sensor of the detector 36. In a normal microcope viewing arrangement, the detector 36 would be comparable to the retina of the observer's eye. In this apparatus, the detector 36 has a semiconductor sensing element 38 of the same semiconductor material as the body 10 under observation. The reason for this requirement will be explained in further detail hereinafter. Preferably, detector 36 is a video camera which has a semiconductor photo-detector element. All semiconductor photo-detector elements depend on the generation of a hole-electron pair by the incident light to generate a signal. In the preferred embodiment, the semiconductor photo-detector element 38 has an array of photo-diodes consisting of reverse biased diodes 40 on a silicon wafer 42. Diodes 40 consist basically of small regions of P type conductivity on an N type substrate. An apertured layer 44 of $SiO_2$ is deposited on the rear surface of wafer 42 as shown in FIG. 1. The photo-diodes face an electron beam 46 which sequentially scans the surface of the sensing element 38. The electron beam 46, emanating from a conventional electron gun having a cathode 43, is controlled by an accellerator electrode 45, a focusing electrode 47, and deflecting plates 51. During the operation, the electron beam 46 charges the surface of the silicon to the cathode potential, thereby reverse biasing the diodes 40. The N type substrate 42 maintains a uniform potential except for a space charged region surrounding each diode. Leakage current per diode is sufficiently small, normally less than $10^{-14}$ amperes, that the reverse bias voltage can be maintained for many seconds in the dark. Since the scanning beam 46 is larger than the diode spacing, the discrete nature of the array does not significantly limit the resolution of the tube and the registration of the beam with the rows of diodes in the array is unnecessary. An image is formed on the surface of wafer 42 opposite to the array of diodes 40. The incident light penetrates the substrate and is absorbed, creating hole-electron pairs. Holes are the minority carriers in the N type material of the substrate. A fraction of them diffuse into the space charge region where the space charge field immediately sweeps them across the junction into the P type region or island, thus discharging the photo-diodes. This process occurs during the interval between successive scans of the beam. A video signal is thus created as the scanning electron beam recharges successive diodes along the scanning path. The signal is directly proportional to the number of holes discharging the diode which, in turn, is directly proportional to the light intensity. The structure and operation of the video camera is described in detail in an article in *Bell Laboratories Record*, entitled "A Solid State Electron Tube for the Picturephone Set", by E. I. Gordon, June 1967, pp. 175–179. The electron signal obtained from the camera 36 is sent to an electronic to optical conversion circuit 48 and displayed on a TV monitor 49.

Alternately, other system for viewing the semiconductor body 10 could be utilized. For example, a single detector element could be used and moved in an X — Y direction across the focal plane of the detector lens. Transducers would convert the X — Y position of the detector with the position of an electron beam on a CRT tube, or the position of a pen on a recorder. The amplitude of the detected signal at each point would determine the intensity of the electron beam in the CRT tube or the deflectin of the recorder pen. Alternately, one detector element could be used and the sample moved. The observable signal would be generated in a manner similar to that described previously.

In the microscopic examination of a specimen, there are two modes of observation possible, i.e., reflection and transmission. Observation of the reflected light reveals surface details, whereas observation of the transmitted light allows an examination of interior characteristics as well as many surface details. In general, in transmission microscopic investigation of semiconductors as well as other materials, the light transmitted through the material is not visible and, thus, cannot be directly observed with the unaided eye. Semiconducting materials transmit light of energy less than the band-gap. Light of energy greater than the band-gap energy is capable of generating hole-electron pairs by supplying an electron in the valence band with enough energy to make the transition to the conduction band. This light is attenuated very rapidly and is essentially not transmitted. However, light of energy less than the band-gap energy of the semiconductor is absorbed only by the free carriers of the semiconductor. The free carriers respond to the electric field of the electromagnetic lightwave and absorb energy. Thus, for example, infrared light will be transmitted through most semiconductors, being attenuated in proportion to the density of free carriers in the material. Transmission infrared microscopic examination of semiconductor materials is thus possible using a detector that will generate a response or signal proportional to the light transmitted through the semiconductor and incident on the detector. The shortcoming in this application is that the wavelength response of detectors normally used extend to a wavelength much larger than the wavelength corresponding to the band-gap of the semiconductor. The semidonductor transmits light only of wavelength greater than the band-gap wavelength. The detector thus must be able to respond to light greater than the band-gap wavelength. This results in the system of a semiconductor and infra-red detector having a wavelength band-pass response extending from the band-gap of the semiconductor to the cut-off wavelength of the detector. The problem is that the maximum resolving power of the system is determined by the maximum wavelength response of the detector. For example, liquid nitrogen cooled indium antimonide detector has a maximum wavelength response of 5.6 microns, which would limit the resolution of the system using the detector to about 5.6 microns. Closely, what is desired is a detector that has a wavelength response large enough to respond to the light transmitted and yet is as close to the band-gap wavelength as possible.

In this invention, a unique solution has been developed which uses a semiconductor detector of the same material as the semiconductor to be examined. For example, a germanium detector is used in transmission microscopy on germanium, silicon detectors for silicon, etc. It would normally be expected that such a system would not work because all the light capable of generating a response in the detector should ordinarily have been absorbed in passing through the semiconductor sample to be examined. All semiconductor photodetectors depend on the generation of hole-electron pairs by this incident light to generate a signal. Hence, the light must be of energy greater than the band-gap, or wavelength less than the band-gap wavelength. This light would be very strongly absorbed in the sample to be examined, and one would expect that there would be no light available to generate a response in the detector. However, quite unexpectedly, some light is transmitted and is capable of generating a response in the detector. For example, using a silicon diode array for a detector, light was observed in the transmission through a three inch slug of silicon.

This system offers the ultimate limit in infrared transmission microscopy because to be transmitted through the sample, the light must be of a wavelength greater than or equal to the band-gap wavelength, and to generate a response in the detector, the light must be essentially less than or equal to the band-gap wavelength. Thus, resolution is achieved equal to the wavelength of the band-gap of the material. Resolving power of approximately 1 micron has been achieved with this approach, using a silicon detector to examine silicon wafers.

Figure 2:
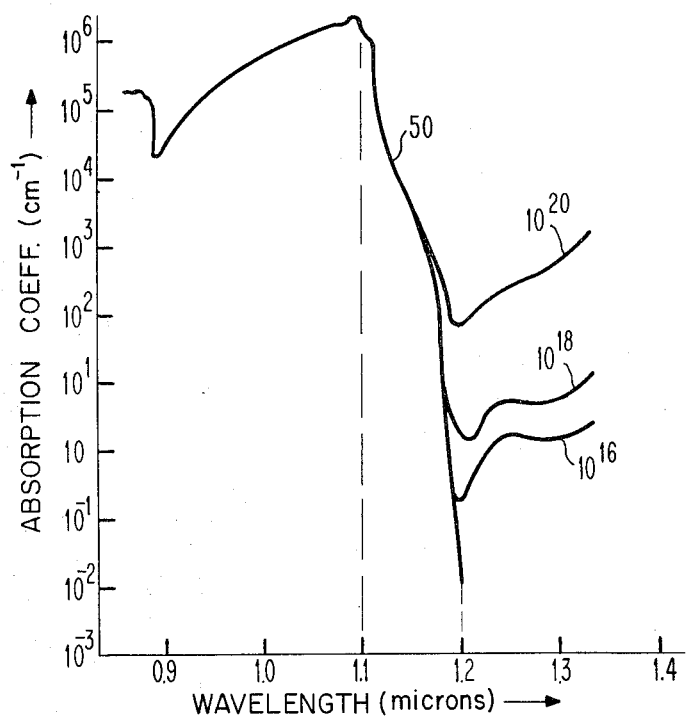
FIG. 2 is a graph of absorption versus wavelength for silicon material.

Referring now to FIG. 2, curve 50 shows the absorption constant of silicon as a function of wavelengths. The graph indicates that in the region of wavelength 1.1 micron, which is the band-gap energy of silicon, there is a pronounced spread between the absorption with density variation of free carriers. As the density of free carriers increases, the absorption constant also increases. The curve clearly indicates that most of the light of wavelength less than 1.1 micron is absorbed by the silicon body 10.

Figure 3:
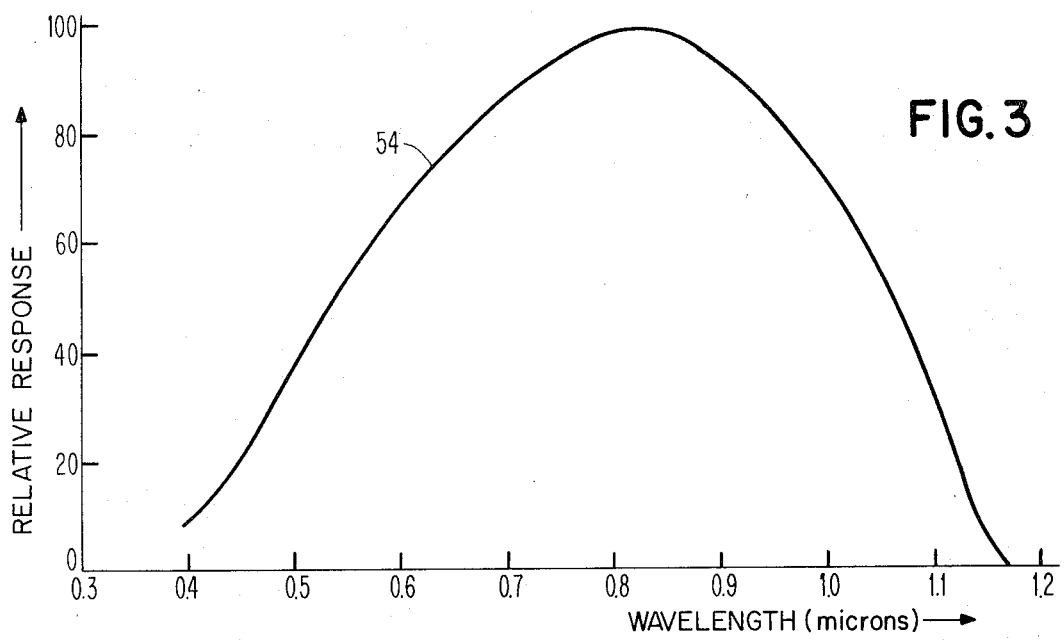
FIG. 3 is a graph of response of a silicon semiconductor light sensor versus wavelength.
Figure 4:
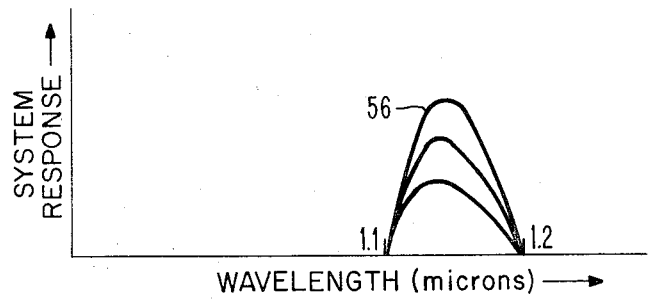
FIG. 4 is a graph of system response for an apparatus versus wavelength.

A light sensing detector using a silicon detector element has a spectral response, as shown by curve 54 in FIG. 3. This curve indicates that a light sensor utilizing a silicon sensing element is essentially blind to light of a wavelength in excess of 1.2 microns. As indicated in FIG. 4 by curve 56, the end result of the system utilizing a silicon sensing element to detect polychromatic light transmitted through a silicon wafer, is a system response sensitive essentially to only light between 1.1 to 1.2 microns. The curve also indicates that there is a significant response variation with free carrier density. Because the free carreirs are introduced into a semiconductor by diffusion or ion implantations, this system can be used to observe the location and nature of diffused or ion implanted regions in a semiconductor body. The same general relationship depicted for silicon also exists for other type semiconductors when both the semiconductor material under investigation and the sensing element of the detector is of the same type material. The system response will be at a different wavelength range depending on the wavelength of the band-gap energy of the material. For example, in the inspection of a germanium wafer with a germanium light sensing element, light of a wavelength less than 0.5 microns is substantially filtered by the germanium wafer, while the germanium sensing element has a negligible response to light of a wavelength greater than 0.6 microns. The overall system response is in the general range of 0.5 to 0.6 microns. Since a high concentration of free carriers is associated with metals and other precipitated impurities, this system can be used to detect and observe precipitates. As, for example, the system will clearly indicate the presence or absence of a thin layer of metal bridging closely spaced conductive lines in metallurgy systems formed by anodic oxidation of aluminum. This method and apparatus is particularly useful for determining the presence of spurious diffusions resulting from poor resist processing, dust particles, and the like. This invention allows the detection of diffusions as small as 1 micron in silicon. Previously, the detection of spurious diffusions required the stripping of all mask insulators and staining to make the diffusion visible in reflection microscopy. With this invention, not only can the spurious diffusions be detected, but since diffusions of different dopant concentrations have different characteristic infrared absorptions due to the concentration of free carriers, the concentration variation can be noted by the contrast.

Pin holes in oxides and other passivating insulation layers have led to device degradation. The small size of pin holes made the detection very difficult. The oxide integrity can now be checked after diffusion, since the dopants diffused through these pin holes and can be observed because of the high resolution of the system. Previously, the oxide has to be stripped and then the wafer stained and examined. This invention permits a non-destructive monitoring procedure for the detection of pin holes.

In another application, the space or distance between diffusions can be detected. An example is the measurement of channel lengths in a field effect transistor. Previously, such diffusions could be examined only by the removal of the oxide and staining as previously described. With this invention, the location of the diffusions and the distance therebetween can be observed and measured non-destructively.

Because of the high resolution and smaller depth of field, with this apparatus it is possible to add a third dimension to transmission microscopy of semiconductors. It is possible to focus on any region from the bottom of the wafer to the top. Buried diffused areas can be observed and their dimensions measured.

While the invention has been particularly shown and described with reference to preferred embodiments thereof, it will be understood by those skilled in the art that the foregoing and other changes in form and details may be made therein without departing from the spirit and scope of the invention.

We claim:

1. A method of detecting internal inclusions in a semiconductor body comprising:
    directing through said body a beam of polychromatic light wherein the major portion of light transmitted is of energy less than the band-gap energy of the semiconductor material of said body,
    sensing the light energy transmitted through said body, with a light sensing element of the same type semiconductor material as said body, generating signals proportional to said sensed light energy, and utilizing said signals for detecting said inclusions.

2. The method of claim 1 wherein said semiconductor body is silicon, and wherein light of a wavelength less than 1.1 microns is substantially filtered by the body, the silicon sensing element has a negligible response to light of a wavelength greater than 1.2 microns, the overall system response thus substantially being in the range of 1.1 to 1.2 microns.

3. The method of claim 1 wherein said semiconductor body is germanium, and wherein light of a wavelength less than 0.5 microns is substantially filtered by the body, the germanium sensing element has a negligible response to light of a wavelength greater than 0.6 microns, the overall system response thus substantially being in the range of 0.5 to 0.6 microns.

4. An apparatus for detecting the presence of inclusions in a semiconductor body comprising:

a polychromatic light source means for directing through said body a beam of polychromatic light wherein the major portion of light transmitted is of energy less than the band gap energy of the semiconductor material of said body, a mounting means for supporting a semiconductor body adjacent said light source, a light sensing means positioned for sensing light transmitted through said body from said light source and for generating signals proportional to said sensed light, said sensing means comprising a light sensing element of the same type semiconductor material of said body, a means responsive to said signals for indicating the relative amounts of light transmitted through said semiconductor body.

5. The apparatus of claim 4 wherein said light source is a tungsten filament light bulb.

6. The apparatus of claim 4 wherein said semiconductor material of said light sensing means is silicon.

7. The apparatus of claim 1 wherein said semiconductor material of said light sensing means is germanium.

8. The apparatus of claim 4 wherein said light sensing measn is an image converter for electrically line scanning an area of said semiconductor body of said sensor means, thereby providing video output signals, and said means for indicating the relative amounts of light transmitted is a display screen operating on the output of said image converter.

* * * * *